United States Patent
Kakinuki

(10) Patent No.: US 11,084,656 B2
(45) Date of Patent: Aug. 10, 2021

(54) AUTOMATED STOREROOM SYSTEM

(71) Applicant: Murata Machinery, Ltd., Kyoto (JP)

(72) Inventor: Tsuyoshi Kakinuki, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 132 days.

(21) Appl. No.: 16/615,521

(22) PCT Filed: Jun. 5, 2018

(86) PCT No.: PCT/JP2018/021589
§ 371 (c)(1),
(2) Date: Nov. 21, 2019

(87) PCT Pub. No.: WO2019/008999
PCT Pub. Date: Jan. 10, 2019

(65) Prior Publication Data
US 2020/0087070 A1    Mar. 19, 2020

(30) Foreign Application Priority Data

Jul. 7, 2017 (JP) .............................. JP2017-134044

(51) Int. Cl.
*B65G 1/137* (2006.01)
(52) U.S. Cl.
CPC .................................... *B65G 1/137* (2013.01)
(58) Field of Classification Search
CPC ...................................................... B65G 1/137
See application file for complete search history.

(56) References Cited

U.S. PATENT DOCUMENTS

| | | | | |
|---|---|---|---|---|
| 5,340,262 | A * | 8/1994 | Tsujimoto | G06Q 10/08 414/273 |
| 5,564,528 | A * | 10/1996 | Goto | B66F 9/072 187/261 |
| 7,729,797 | B2 * | 6/2010 | Akamatsu | B65G 1/0421 700/214 |
| 7,787,985 | B2 * | 8/2010 | Tsujimoto | B65G 1/06 700/214 |
| 8,670,861 | B2 * | 3/2014 | Yoshinaga | B65G 1/0407 700/218 |

(Continued)

FOREIGN PATENT DOCUMENTS

CN  103738640    4/2014
JP  H3-073505 U  7/1991
(Continued)

*Primary Examiner* — Kyle O Logan
(74) *Attorney, Agent, or Firm* — DLA Piper LLP (US)

(57) ABSTRACT

An automated storeroom system includes storerooms each including a rack and a stacker crane, and a transport vehicle configured to travel along a route. A first rack that is the rack in one storeroom of an adjacent pair of the storerooms and a second rack that is the rack in the other storeroom thereof are disposed in a manner opposed to each other. The route includes a first route passing through the first rack in a longitudinal direction of the first rack and configured to allow the transport vehicle to transfer the article onto the second rack, a second route passing through the second rack in a longitudinal direction of the second rack and configured to allow the transport vehicle to transfer the article onto the first rack, and a connection route connecting the first route and the second route.

11 Claims, 7 Drawing Sheets

(56) References Cited

U.S. PATENT DOCUMENTS

| | | |
|---|---|---|
| 9,452,886 B2 * | 9/2016 | Yamashita ............ B65G 1/1378 |
| 10,067,501 B2 | 9/2018 | Wurman et al. |
| 10,710,803 B2 * | 7/2020 | Grosse ................. B65G 1/0435 |
| 2011/0097182 A1 * | 4/2011 | Schmit ................. B65G 1/0407 |
| | | 414/277 |
| 2014/0301810 A1 * | 10/2014 | Steinbach ............ B65G 1/0492 |
| | | 414/273 |
| 2017/0152106 A1 * | 6/2017 | Hofmann ............. B65G 1/0407 |
| 2017/0203920 A1 * | 7/2017 | Otto ..................... B65G 1/0492 |
| 2017/0203921 A1 * | 7/2017 | Issing ..................... B65G 1/06 |

FOREIGN PATENT DOCUMENTS

| | | |
|---|---|---|
| JP | H11-116004 | 4/1999 |
| JP | H11-116005 | 4/1999 |
| JP | H11-116006 | 4/1999 |
| JP | 2009-541178 | 11/2009 |

\* cited by examiner

AUTOMATED STOREROOM SYSTEM

TECHNICAL FIELD

This disclosure relates to an automated storeroom system.

BACKGROUND

Conventionally, an automated storeroom system including: a plurality of storerooms each including a rack and a stacker crane; and a transport vehicle configured to travel along a preset route to load and unload articles into and from the storerooms is known. For example, in an automated storeroom system described in Japanese Unexamined Patent Publication No. H11-116004, it is proposed that a system area is made compact by using the inside of a rack as a standby position for a transport vehicle.

In the above-described conventional technique, it is proposed that the system area is made compact as described above. However, to load and unload many articles in a small space, there is still room for improvement.

In view of this, it could be helpful to provide an automated storeroom system that enables many articles to be loaded and unloaded in a small space.

SUMMARY

I thus provide:

An automated storeroom system includes: a plurality of storerooms each including a rack and a stacker crane; and a transport vehicle configured to travel along a preset route to load and unload an article into and from the storerooms. A first rack that is the rack in one storeroom of an adjacent pair of the storerooms and a second rack that is the rack in the other storeroom thereof are disposed in a manner opposed to each other. The route along which the transport vehicle travels includes: a first route passing through the first rack in a longitudinal direction of the first rack and configured to allow the transport vehicle to transfer the article onto the second rack; a second route passing through the second rack in a longitudinal direction of the second rack and configured to allow the transport vehicle to transfer the article onto the first rack; and a connection route provided from either one of the first rack and the second rack to the other thereof and connecting the first route and the second route.

In this automated storeroom system, by using the racks, passage of the transport vehicle and loading and unloading by the transport vehicle can be performed. This enables many articles to be loaded and unloaded in a small space.

The route along which the transport vehicle travels may further include a circulation route connected to at least either one of the first route and the second route outside the rack. The first route and the second route each may be a one-way traffic route on which the transport vehicle travels only in one direction. With this configuration, a plurality of the transport vehicles are allowed to travel smoothly along the route, and thus many articles can be loaded and unloaded.

The transport vehicle may include a lifter configured to raise and lower the article to be conveyed. A placement platform on which the article is to be placed may be provided in each of a lower portion of the first rack into which the article is to be transferred from the second route by the transport vehicle and a lower portion of the second rack into which the article is to be transferred from the first route by the transport vehicle. The placement platform may have a space that allows the transport vehicle to enter below the placement platform. With this configuration, a conveyor and the like for loading and unloading when an article is loaded into and unloaded from each storeroom can be eliminated, and thus cost can be reduced.

Each storeroom may include at least two stacker cranes arranged in series. The route along which the transport vehicle travels may include at least two first routes, at least two second routes, and at least three connection routes. With this configuration, loading and unloading into and from the storeroom including at least two stacker cranes can be performed, and thus more articles can be loaded and unloaded.

A first transport-vehicle retreat space that the transport vehicle is capable of entering from the second route and the transport vehicle is capable of exiting into the second route may be formed in a lower portion of the first rack. A second transport-vehicle retreat space that the transport vehicle is capable of entering from the first route and the transport vehicle is capable of exiting into the first route may be formed in a lower portion of the second rack. With this configuration, into the first transport-vehicle retreat space in the lower portion of the first rack or the second transport-vehicle retreat space in the lower portion of the second rack, the transport vehicle enters below, and thus another following transport vehicle can overtake the transport vehicle on the second route or the first route.

I can thus provide an automated storeroom system that enables many articles to be loaded and unloaded in a small space.

BRIEF DESCRIPTION OF THE DRAWINGS

FIG. 2(*b*) is another front view illustrating the loading ports of the automated storeroom system in FIG. 1.

FIG. 3(*b*) is another front view illustrating the unloading ports of the automated storeroom system in FIG. 1.

Figure 1:
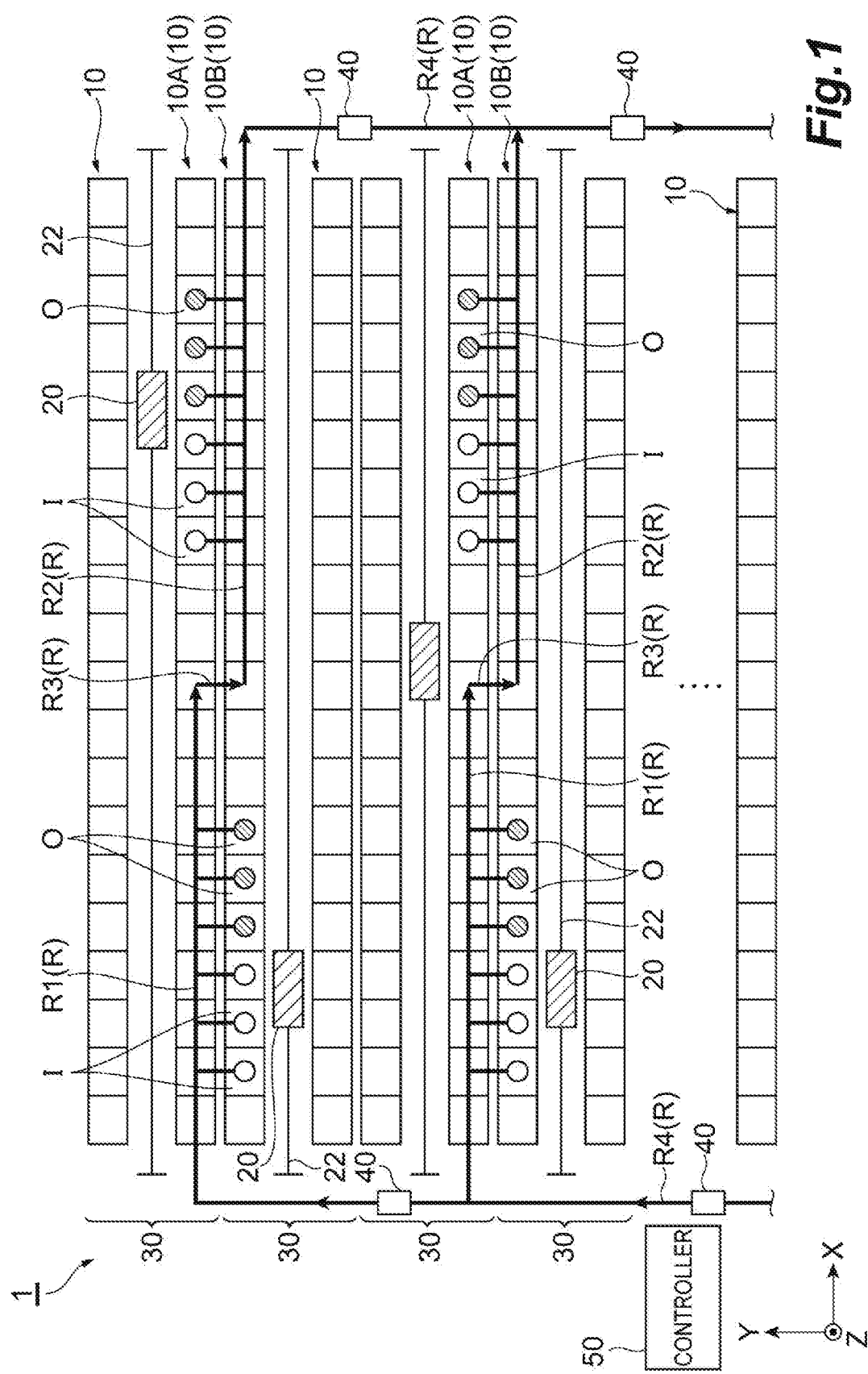
FIG. 1 is a schematic plan view illustrating an arrangement structure of an automated storeroom system according to a first example.
Figure 2:
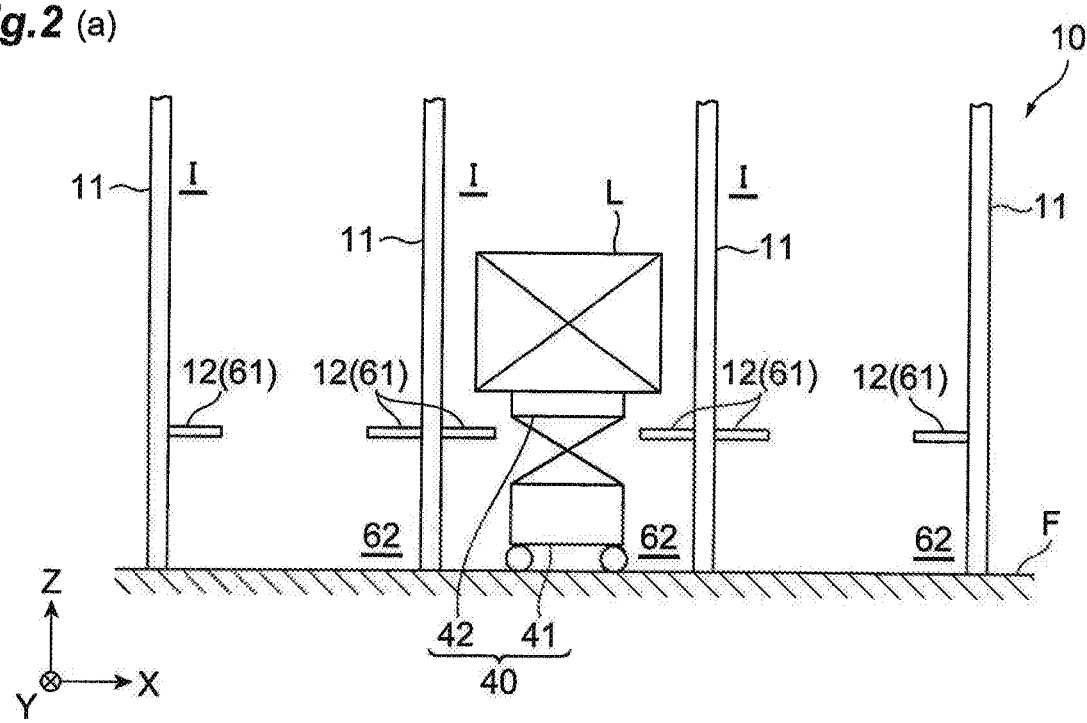
FIG. 2(*a*) is a front view illustrating loading ports of the automated storeroom system in FIG. 1.
Figure 2:
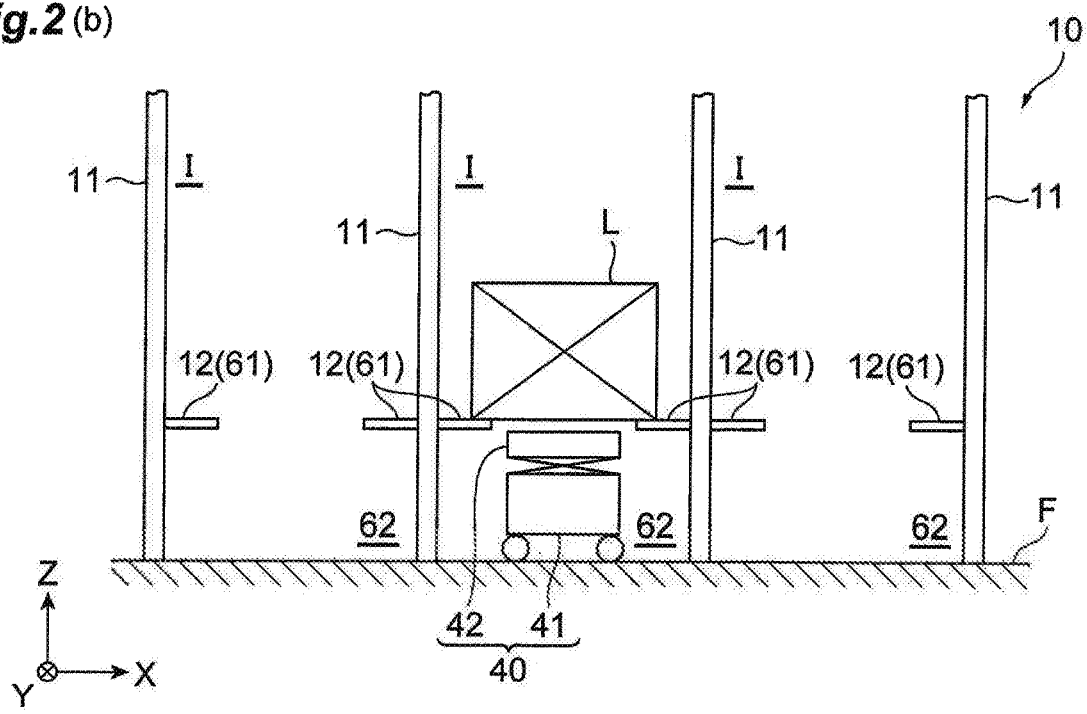
Figure 3:
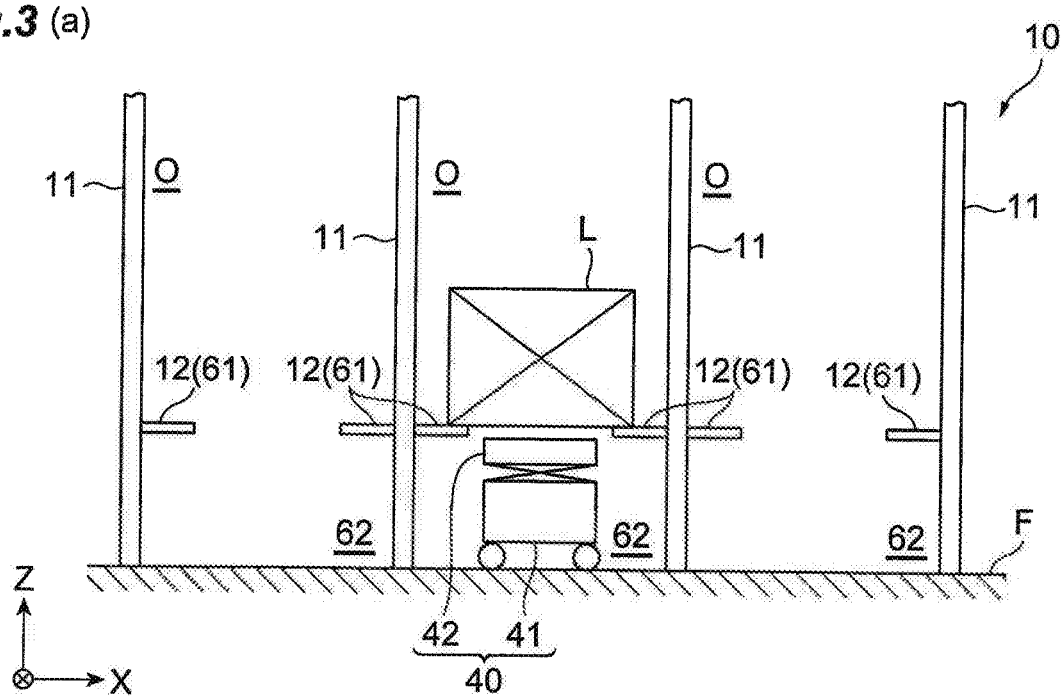
FIG. 3(*a*) is a front view illustrating unloading ports of the automated storeroom system in FIG. 1.
Figure 3:
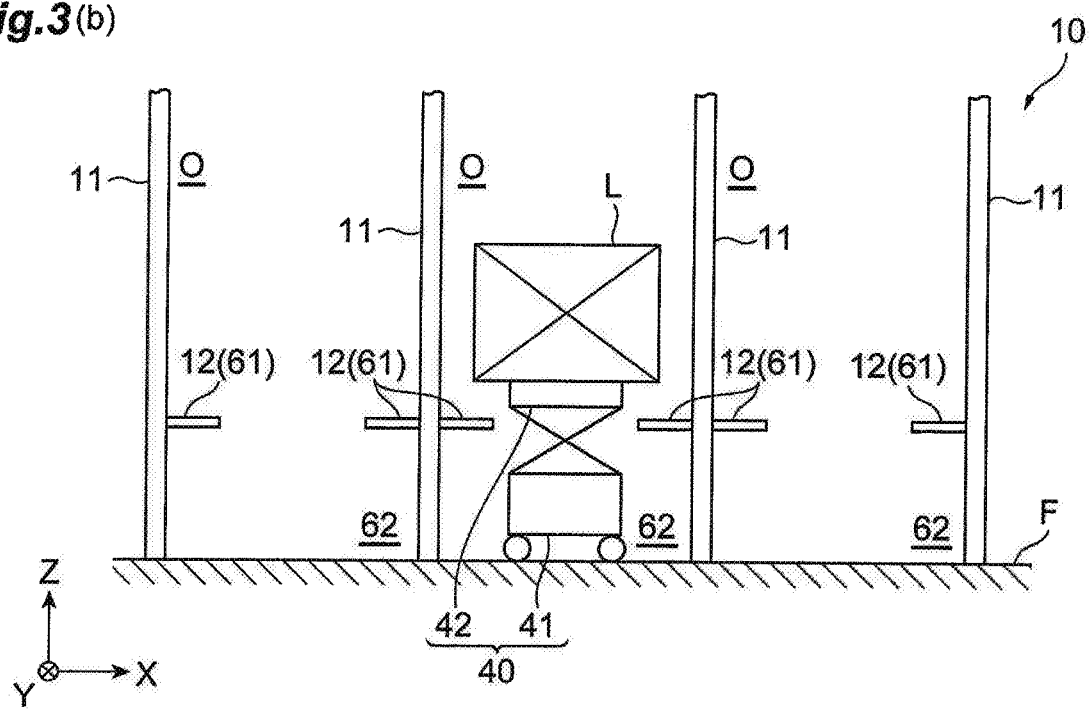

REFERENCE SIGNS LIST 1, 101, 201, 301, 401 automated storeroom system
10 rack
10A first rack
10B second rack
20 stacker crane
30 storeroom
40 transport vehicle
42 lifter
61 placement platform
62 underneath entering space (space)

L article
R route
R1 first route
R2 second route
R3 connection route
R4 circulation route

DETAILED DESCRIPTION

Examples will now be described in detail with reference to the drawings. Like or equivalent elements are designated by like reference sings in each drawing, and duplicate description is omitted.

First Example

As illustrated in FIGS. 1 to 3(a)-3(b), an automated storeroom system 1 according to a first example includes: a plurality of storerooms 30 each including a rack 10 and a stacker crane 20; transport vehicles 40 each configured to load and unload an article L into and from the storerooms 30; and a controller 50 that is a control device configured to control the automated storeroom system 1.

The terms "upper" and "lower" correspond to the upper side and the lower side, respectively, in the vertical direction. The "Z-direction" is a vertical direction, indicating a step direction of the rack 10. The "X-direction" is a horizontal direction, indicating a longitudinal direction of the rack 10. The "Y-direction" is a horizontal direction orthogonal to the X-direction and the Z-direction, indicating a direction in which the storerooms 30 are disposed in parallel.

The storerooms 30 are disposed in a building, for example. Each storeroom 30 uses the corresponding stacker crane 20 to automatically store therein an article L conveyed by a transport vehicle 40, and also uses the stacker crane 20 to automatically take out therefrom the stored article L. The storerooms 30 are disposed in parallel along the Y-direction. The size, the shape, and the weight, for example, of the article L are not limited to particular ones, and any type of objects may be used as articles L.

In each storeroom 30, a pair of racks 10 are disposed in a manner spaced apart from each other in the Y-direction, and the longitudinal direction thereof corresponds to the X-direction. Each rack 10 has a plurality of article placement portions, in each of which an article L is to be placed and stored, in the X-direction and in the Z-direction. With this configuration, the rack 10 stores articles L in matrix patterns in the X-direction and the Z-direction. A first rack 10A that is a rack 10 in one storeroom 30 of an adjacent pair of storerooms 30 and a second rack 10B that is a rack 10 in the other storeroom 30 thereof are disposed in a manner adjacent (close) and opposed to each other. Herein, the first rack 10A in the one storeroom 30 and the second rack 10B in the other storeroom 30 are disposed closely back to back.

Each stacker crane 20 travels on a traveling rail 22 installed along the X-direction between racks 10 that are opposed in the Y-direction in the corresponding storeroom 30. The stacker crane 20 includes: a traveling vehicle that can travel along the traveling rail 22; and a lifting platform that can ascend and descend along a mast on this traveling vehicle and is provided with a transfer device. The stacker crane 20 conveys an article L among article placement portions of the racks 10 and a loading port I and an unloading port O described later. The stacker crane 20 transfers (loads and unloads) an article L onto and from the article placement portions of the racks 10, the loading port I, and the unloading port O. Operation of the stacker crane 20 is controlled by the controller 50.

The stacker crane 20 herein is not limited to a particular one, and various types of known stacker cranes may be used. For example, as the stacker crane 20, a device of a rear-hook type configured to take in an article L with a hook being hooked on the rear end thereof, a device of a clamp type configured to transfer an article L while holding both sides thereof, a device of a fork type configured to transfer an article L while lifting up the article L with sliding forks, or a device of a front-hook type configured to take in an article L with a hook being hooked on the front end thereof, for example, may be used.

Each transport vehicle 40 is a vehicle for transport that travels without a driver. The transport vehicle 40 travels along a preset route R. The transport vehicle 40 can transfer an article L between a loading port I and an unloading port O. As the transport vehicle 40, an automatic guided vehicle (AGV) is used. The transport vehicle 40 includes a vehicle body 41 configured to be guided by the route R to travel and a lifter 42 as a transfer device provided above the vehicle body 41 and configured to raise and lower an article L. A guiding method used for the transport vehicle 40 is not limited to a particular one, and methods of any type such as a magnetically guiding type, a laser-guiding type, or a rail-guiding type may be used. The route R may be configured with a magnetic tape (magnetic marker), a laser-reflecting plate, or a rail, for example. Operation of the transport vehicle 40 is controlled by the controller 50. The transport vehicle 40 is not limited particularly to the AGV, and may be an overhead traveling vehicle or a rail-guided vehicle, for example The route R along which the transport vehicle 40 travels includes first routes R1, second routes R2, connection routes R3, and a circulation route R4.

Each first route R1 passes through a lower portion of the corresponding first rack 10A in the X-direction. The lower portion of the first rack 10A corresponds to the lowermost step of the first rack 10A. The lower portion of the first rack 10A is a space part extending over a predetermined length above a floor F in the first rack 10A. The first route R1 is a one-way traffic route along which each transport vehicle 40 travels only in one direction. The one-way traffic directions of the respective first routes R1 of the storerooms 30 are the same direction. In the illustrated example, each first route R1 is provided from one end of the lower portion of the corresponding first rack 10A to a central position thereof in the X-direction.

Above each first route R1 in a lower portion of the corresponding first rack 10A, a passing space for a transport vehicle 40 to pass therethrough is formed. In other words, in the lower portion of the first rack 10A, a passing space that is a space allowing a transport vehicle 40 to move along the first route R1 in this lower portion is formed. This passing space is a space through which a transport vehicle 40 conveying an article L placed on the lifter 42 thereof that has been raised can pass. This passing space extends to pass through along the X-direction. In this passing space, structural members such as lattices are not provided. In this passing space, a pair of posts is provided in a manner spaced apart from each other by a distance greater than the width of the transport vehicle 40 in the Y-direction.

From each first route R1, an article L can be transferred to the corresponding second rack 10B by a transport vehicle 40. In a lower portion of the second rack 10B into which an article L is to be transferred from the first route R1 by the transport vehicle 40, a loading port I and an unloading port O are provided. The loading port I is provided in plurality (herein, three) in a row to be adjacent to each other in the X-direction in the lower portion of the second rack 10B. The unloading port O is provided in plurality (herein, three) in a row to be adjacent to each other in the X-direction in the lower portion of the second rack 10B. A group of the loading ports I is adjacent to a group of the unloading ports O in the X-direction.

Between a lower portion of each first rack 10A and a lower portion of the corresponding second rack 10B, transfer spaces each of which is a space allowing the transport from the first route R1 to the corresponding loading port I and the corresponding unloading port O are formed. Each transfer space extends to pass through in the Y-direction. In the transfer space, structural members such as lattices and back-side braces are not provided.

As illustrated in FIGS. 2(a)-2(b), at each loading port I, an article L is loaded into the corresponding storeroom 30 by a transport vehicle 40. The loading port I is provided with a placement platform 61 on which an article L is to be placed. The placement platform 61 has an underneath entering space (space) 62 allowing a transport vehicle 40 to enter below the placement platform 61. In the illustrated example, the placement platform 61 is configured with article support members 12 that are each provided to a pair of posts 11 adjacent to each other in the X-direction in the rack 10. The pair of posts 11 is provided in a manner spaced apart from each other by a distance greater than the width of the transport vehicle 40 in the X-direction. The distance between a pair of the article support members 12 is greater than the width of the lifter 42 in the X-direction. The distance between the pair of the article support members 12 is smaller than the width of the article L in the X-direction. The underneath entering space 62 is formed by a space between the article support members 12 and the floor F.

As illustrated in FIGS. 1 and 2(a)-2(b), a transport vehicle 40 conveying an article L placed on the lifter 42 thereof that has been raised enters a loading port I from the corresponding first route R1 as shown in FIG. 2(a). The transport vehicle 40 moves to a position where the vehicle body 41 has completely entered the corresponding underneath entering space 62 to stop, and then the lifter 42 is lowered, whereby the article L is transferred from the transport vehicle 40 onto the corresponding placement platform 61 as shown in FIG. 2(b). Thus, loading of the article L is completed. Subsequently, the transport vehicle 40 returns to the first route R1 with the lifter 42 left being lowered, for example, and moves along the first route R1.

As illustrated in FIGS. 3(a)-3(b), at an unloading port O, an article L is unloaded from the corresponding storeroom 30 by a transport vehicle 40. The unloading port O is provided with a placement platform 61 described above in the same manner as in the loading port I.

As illustrated in FIGS. 1 and 3(a)-3(b), onto the unloading port O, the article L is placed in advance (before the transport vehicle 40 enters). The transport vehicle 40 with the lifter 42 that has been lowered enters the unloading port O from the corresponding first route R1 as shown in FIG. 3(a). The transport vehicle 40 moves to a position where the vehicle body 41 has completely entered the corresponding underneath entering space 62 to stop, and then the lifter 42 is raised, whereby the article L is transferred from the corresponding placement platform 61 onto the transport vehicle 40 as shown in FIG. 3(b). The transport vehicle 40 exits the unloading port O to return to the first route R1, and thus unloading of the article L is completed. Subsequently, the transport vehicle 40 moves along the first route R1 with the article L left being placed on the lifter 42, for example.

Each second route R2 passes through a lower portion of the corresponding second rack 10B in the X-direction. The lower portion of the second rack 10B corresponds to the lowermost step of the second rack 10B. The lower portion of the second rack 10B is a space part extending over a predetermined length above the floor F in the second rack 10B. The second route R2 is a one-way traffic route along which each transport vehicle 40 travels only in one direction. The one-way traffic directions of the respective second routes R2 of the storerooms 30 are the same direction. In the illustrated example, each second route R2 is provided from the other end (the end opposite to the first route side) of the lower portion of the corresponding second rack 10B to a central position thereof in the X-direction.

Above each second route R2 in a lower portion of the corresponding second rack 10B, a passing space for a transport vehicle 40 to pass therethrough is formed. In other words, in the lower portion of the second rack 10B, a passing space that is a space allowing a transport vehicle 40 to move along the second route R2 in this lower portion is formed. This passing space is a space through which a transport vehicle 40 conveying an article L placed on the lifter 42 thereof that has been raised can pass. This passing space extends to pass through along the X-direction. In this passing space, structural members such as lattices are not provided. In this passing space, a pair of posts is provided in a manner spaced apart from each other by a distance greater than the width of the transport vehicle 40 in the Y-direction.

From each second route R2, an article L can be transferred to the corresponding first rack 10A by a transport vehicle 40. In a lower portion of the first rack 10A into which an article L is to be transferred from the second route R2 by the transport vehicle 40, loading ports I and unloading ports O described above are provided. Between a lower portion of each first rack 10A and a lower portion of the corresponding second rack 10B, transfer spaces each of which is a space allowing the transport from the second route R2 to the corresponding loading port I and the corresponding unloading port O are formed. Each transfer space extends to pass through in the Y-direction. In the transfer space, structural members such as lattices and back-side braces are not provided.

Each connection route R3 is provided from a lower portion of either one of the corresponding first rack 10A and the corresponding second rack 20B to a lower portion of the other thereof. The connection route R3 is provided midway (at a center, herein) between the first rack 10A and the second rack 20B in the X-direction. The connection route R3 connects the first route R1 and the second route R2 to each other. The connection route R3 is a one-way traffic route along which each transport vehicle 40 travels only in one direction. Above each connection route R3 in a lower portion of the corresponding first rack 10A and a lower portion of the corresponding second rack 10B, a connecting space for a transport vehicle 40 to pass therethrough is formed. In other words, in the lower portion of the first rack 10A and the lower portion of the second rack 10B, a connecting space that is a space allowing a transport vehicle 40 to move along the connection route R3 in these lower portions is formed. This connecting space extends to pass through along the Y-direction. In this connecting space, structural members such as lattices and back-side braces are not provided.

The circulation route R4 is connected to at least any of the first routes R1 and the second routes R2 outside the racks 10.

The circulation route R4 is a two-way traffic route along which each transport vehicle 40 travels in one direction and the other direction. In the illustrated example, the circulation route R4 is connected to upstream sides of the first routes R1 outside the racks 10. The circulation route R4 is also connected to downstream sides of the second routes R2 outside the racks 10. The circulation route R4 extends continuously from the downstream sides of the second routes R2 to the upstream sides of the first routes R1. With the circulation route R4, each transport vehicle 40 that has passed through a second route R2 can be circulated to a first route R1. The circulation route R4 may be of a one-way traffic. The circulation route R4 may be a route having two or more lanes.

In the route R configured as described above, each transport vehicle 40 enters a first route R1 from the circulation route R4, travels on the first route R1, and moves to the corresponding second route R2 through the corresponding connection route R3. The transport vehicle 40 travels on the second route R2 and exits into the circulation route R4. Subsequently, the transport vehicle 40 travels on the circulation route R4 to enter the first route R1 again.

The controller 50 is a computer including a read only memory (ROM) in which a program and the like are stored, a random access memory (RAM) for temporarily storing data, a recording medium such as a hard disk drive (HDD), a central processing unit (CPU), and a communication circuit. Based on a signal output by the CPU, the controller 50 stores input data in the RAM, loads a program stored in the ROM into the RAM, and executes the program loaded into the RAM, thereby implementing various functions.

The controller 50 is connected to each stacker crane 20 by radio or wire. The controller 50 controls traveling of the stacker crane 20 and transfer of an article L performed by the stacker crane 20. The controller 50 is connected to each transport vehicle 40 by radio or wire. The controller 50 controls traveling of the transport vehicle 40 and operation of the lifter 42 of the transport vehicle 40.

As described above, in the automated storeroom system 1, in the lower portion of each first rack 10A and the lower portion of the corresponding second rack 10B, the corresponding first route R1, the corresponding second route R2, and the corresponding connection route R3 are provided as the route R along which each transport vehicle 40 travels. The transport vehicle 40 can travel in a crank-like manner routed from the lower portion of the first rack 10A to the lower portion of the second rack 10B. At this time, the transport vehicle 40 can transfer an article L from the first route R1 onto the second rack 10B, and can transfer an article L from the second route R2 onto the first rack 10A.

Thus, in the automated storeroom system 1, by using the racks 10 (using lower portions of the racks 10 in particular), passage of a transport vehicle 40 and loading and unloading by the transport vehicle 40 can be performed. This enables many articles L to be loaded and unloaded in a small space. Furthermore, the footprint of the automated storeroom system 1 can be reduced. Many loading ports I and unloading ports O can be provided, and thus operation flexibility of each stacker crane 20 can be increased.

In the automated storeroom system 1, the route R along which each transport vehicle 40 travels further includes the circulation route R4. The first routes R1 and the second routes R2 are one-way traffic routes on each of which a transport vehicle 40 travels only in one direction. With this configuration, even when many transport vehicles 40 are present on the first routes R1 and the second routes R2, traffic can be prevented from being obstructed by one another (from being adversely affected by other transport vehicles 40), and thus many transport vehicles 40 can smoothly travel. The transport vehicles 40 can be prevented from being delayed on the first routes R1 and the second routes R2. This enables many transport vehicles 40 to smoothly travel along the route R, and thus many articles L can be loaded and unloaded.

In the automated storeroom system 1, each transport vehicle 40 has the lifter 42. The loading ports I and the unloading ports O of the first racks 10A and the second racks 10B are each provided with the placement platform 61. Each placement platform 61 has the underneath entering space 62 that allows a transport vehicle 40 to enter below the placement platform 61. With this configuration, an article L can be loaded into or unloaded from each storeroom 30 by causing a transport vehicle 40 to enter below the corresponding placement platform 61 as shown in FIGS. 2(a)-2(b) and 3(a)-3(b). A conveyor or the like for loading and unloading when an article L is loaded into or unloaded from the storeroom 30 can be eliminated, and thus cost can be reduced.

In the automated storeroom system 1, strict management in operation control of the transport vehicles 40 by the controller 50 is not required, and thus this operation control can be simplified. Because the first routes R1 and the second routes R2 are one-way traffic routes, deadlock in operation control of the transport vehicles 40 by the controller 50 can be prevented from occurring.

Second Example

The following describes an automated storeroom system according to a second example. In the description of this example, points different from those in the first example will be described.

Figure 4:
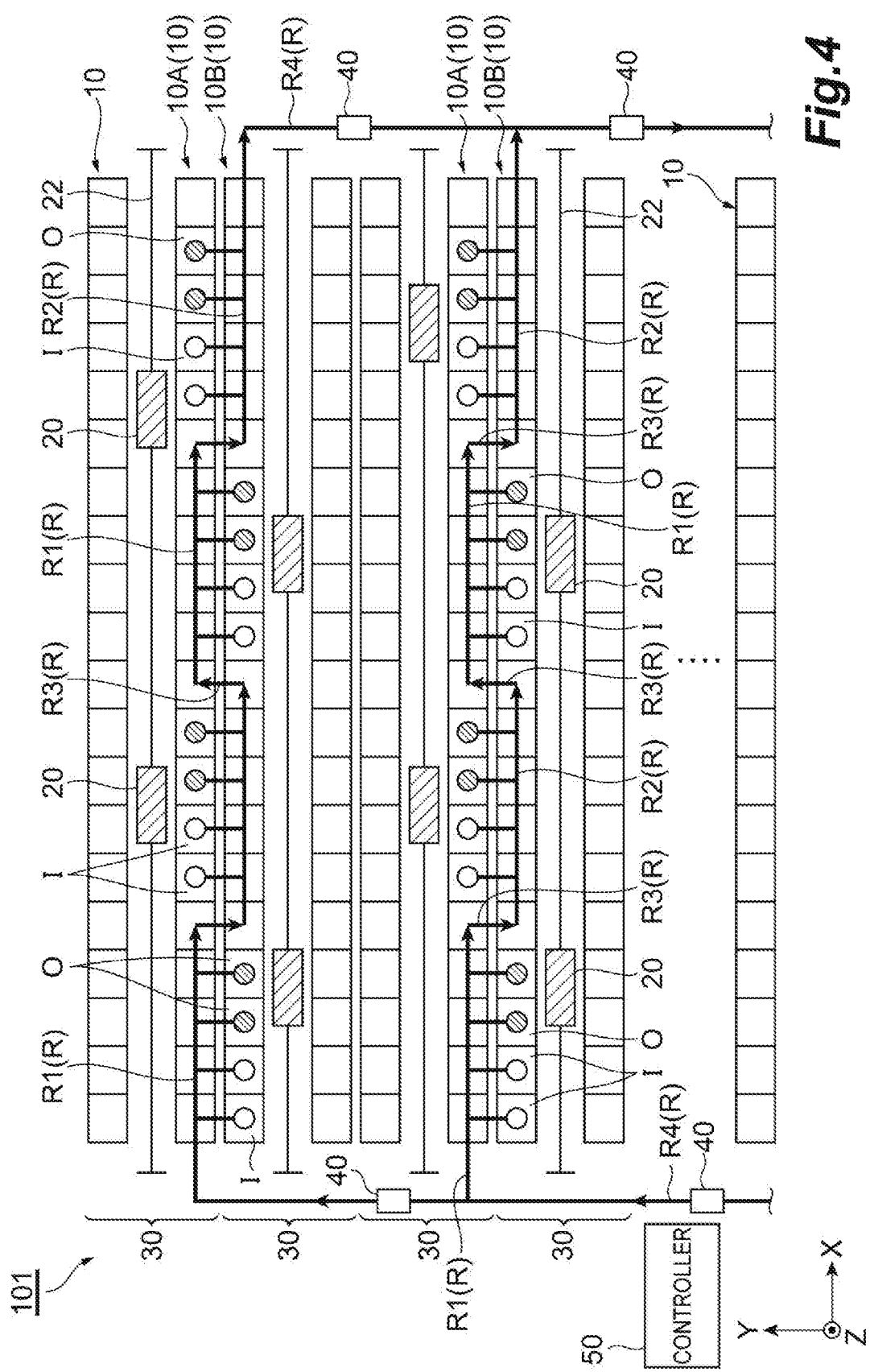
FIG. 4 is a schematic plan view illustrating an arrangement structure of an automated storeroom system according to a second example.

As illustrated in FIG. 4, in this automated storeroom system 101 according to the second example, each storeroom 30 has two stacker cranes 20 arranged in series. The route R along which each transport vehicle 40 travels includes two first routes R1, two second routes R2, and three connection routes R3. In the illustrated example, the first routes R1 are provided, in the X-direction, at one end portion in a lower portion of each first rack 10A and at a central position closer to the other end therein. The second routes R2 are provided, in the X-direction, at the other end in the lower portion of the corresponding second rack 10B and at a central position closer to the one end therein. The connection routes R3 are provided, in the X-direction, at positions that quarter the first rack 10A and the second rack 10B.

In the lower portion of the first rack 10A and the lower portion of the second rack 10B, each transport vehicle 40 travels on the first route R1, moves to the second route R2 through the connection route R3, travels on the second route R2, then moves to the first route R1 through the connection route R3, travels on the first route R1 again, moves to the second route R2 through the connection route R3, and travels on the second route R2. The transport vehicle 40 travels in a rectangular wave pattern between the lower portion of the first rack 10A and the lower portion of the second rack 10B.

As described above, also in the automated storeroom system 101, many articles L can be loaded and unloaded in a small space. In the automated storeroom system 101, loading and unloading can be performed into and from a storeroom 30 having two stacker cranes 20, and thus more articles L can be loaded and unloaded. Even when a plurality of stacker cranes 20 are installed on one traveling rail 22, the number of cranks (connection routes R3) between the corresponding first routes R1 and the corresponding second routes R2 can be increased to match the number of these stacker cranes 20, whereby loading and unloading performance enough for the number of the installed stacker cranes 20 can be achieved.

Each storeroom 30 may have three or more stacker cranes 20. In this example, the route R along which each transport vehicle 40 travels includes three or more first routes R1, three or more second routes R2, and four or more connection routes R3 (the same applies also to a larger number)

Third Example

The following describes an automated storeroom system according to a third example. In the description of this example, points different from those in the first example will be described.

Figure 5:
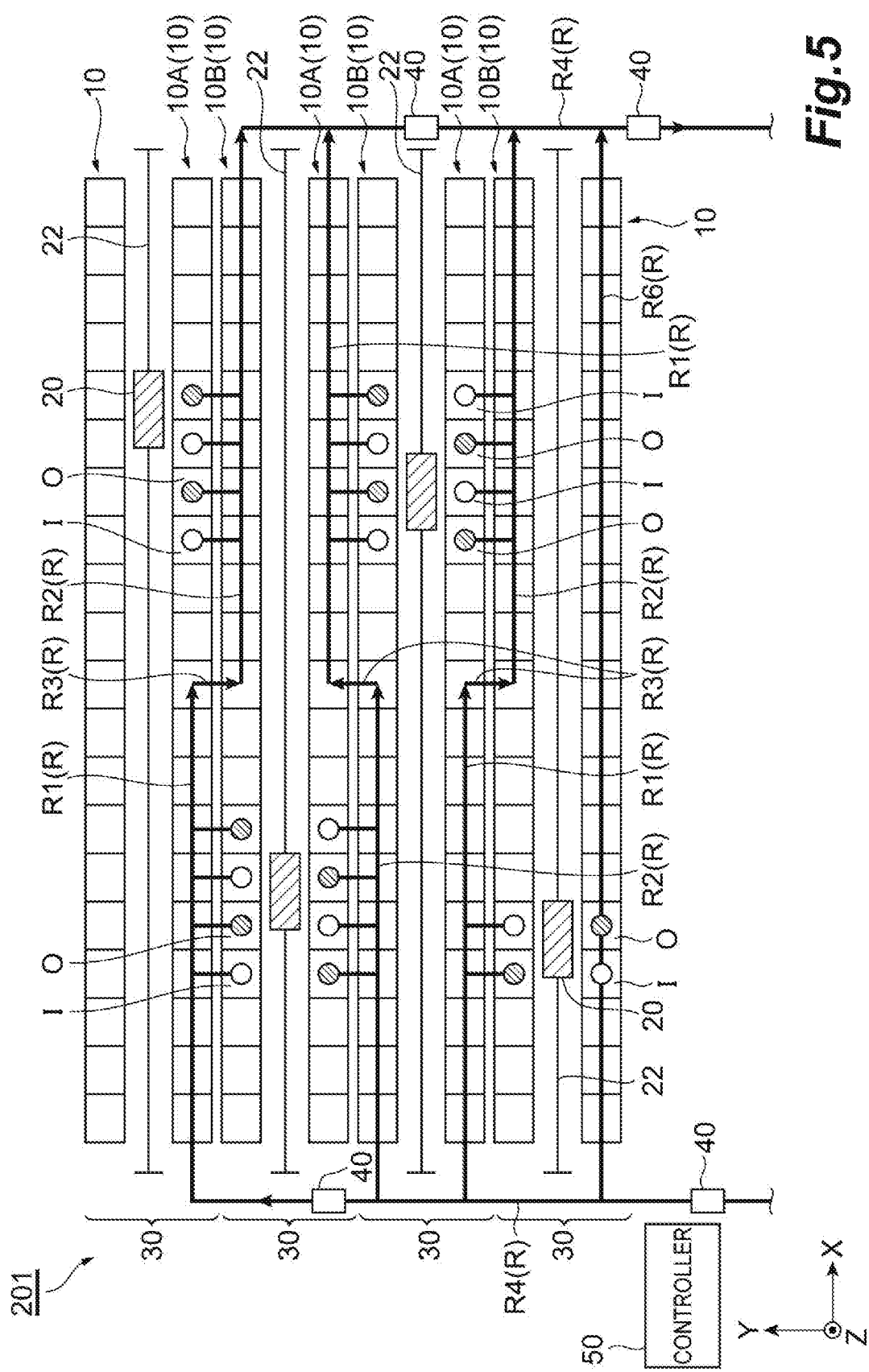
FIG. 5 is a schematic plan view illustrating an arrangement structure of an automated storeroom system according to a third example.

As illustrated in FIG. 5, in this automated storeroom system 201 according to the third example, the route R along which each transport vehicle 40 travels further includes a third route R6. The third route R6 passes through, in the Y-direction, a lower portion of a rack 10 that is positioned at one end of the automated storeroom system 201 in the Y-direction. On the third route R6, a loading port I and an unloading port O are provided. The loading port I and the unloading port O on the third route R6 are each provided with a placement platform on which an article L is to be placed. In the placement platform of each of the loading port I and the unloading port O on the third route R6, a space is formed through which a transport vehicle 40 conveying an article L placed on the lifter 42 thereof that has been raised can pass in the X-direction.

In this example, the route R further includes a route structure formed by a second route R2 arranged on the upstream side of the traveling direction of a transport vehicle 40 and a first route R1 connected to the downstream side of the second route R2 via a connection route R3. Specifically, the route R includes this second route structure formed by the second route R2 arranged on the upstream side of the traveling direction and the first route R1 connected to the downstream side of the second route R2 via the connection route R3, in addition to a first route structure of the first example formed by a first route R1 arranged on the upstream side of the traveling direction and a second route R2 connected to the downstream side of the first route R1 via a connection route R3. The first and second route structures are arranged alternately in Y-direction when the automated storeroom system 201 is viewed from above. In the first and second route structures, one-way traffic directions in the first routes R1 and the second routes R2 are the same direction. In the illustrated example, the first route R1 in the second route structure is provided from the other end of the first rack 10A in the X-direction to a central position. In the illustrated example, the second route R2 in the second route structure is provided from one end of the second rack 10B in the X-direction to a central position thereof.

With the first route structure, a transport vehicle 40 can enter a first route R1 from the circulation route R4 first, travel on the first route R1, then move to the corresponding second route R2 through the corresponding connection route R3, travel on the second route R2, and exit into the circulation route R4. With the second route structure, a transport vehicle 40 can enter a second route R2 from the circulation route R4 first, travel on the second route R2, then move to the corresponding first route R1 through the corresponding connection route R3, travel on the first route R1, and exit into the circulation route R4.

In this example, at least some of a plurality of loading ports I are arranged in a manner opposed to unloading ports O in the Y-direction with a traveling rail 22 interposed therebetween. At least some of a plurality of unloading ports O are arranged in a manner opposed to loading ports I in the Y-direction with a traveling rail 22 interposed therebetween.

As described above, also in the automated storeroom system 201, many articles L can be loaded and unloaded in a small space. With the automated storeroom system 201, operation integrated with the stacker cranes 20 ("crane-integrated operation") can be performed. Specifically, in each storeroom 30 including a loading port I and an unloading port O that are arranged in a manner opposed to each other in the Y-direction with the traveling rail 22 interposed therebetween, the corresponding stacker crane 20 can transfer an article L to the loading port I and can transfer an article L from the unloading port O at this opposed position without moving in the X-direction. This enables operation at a high operating rate.

Fourth Example

The following describes an automated storeroom system according to a fourth example. In the description of this example, points different from those in the first example will be described.

Figure 6:
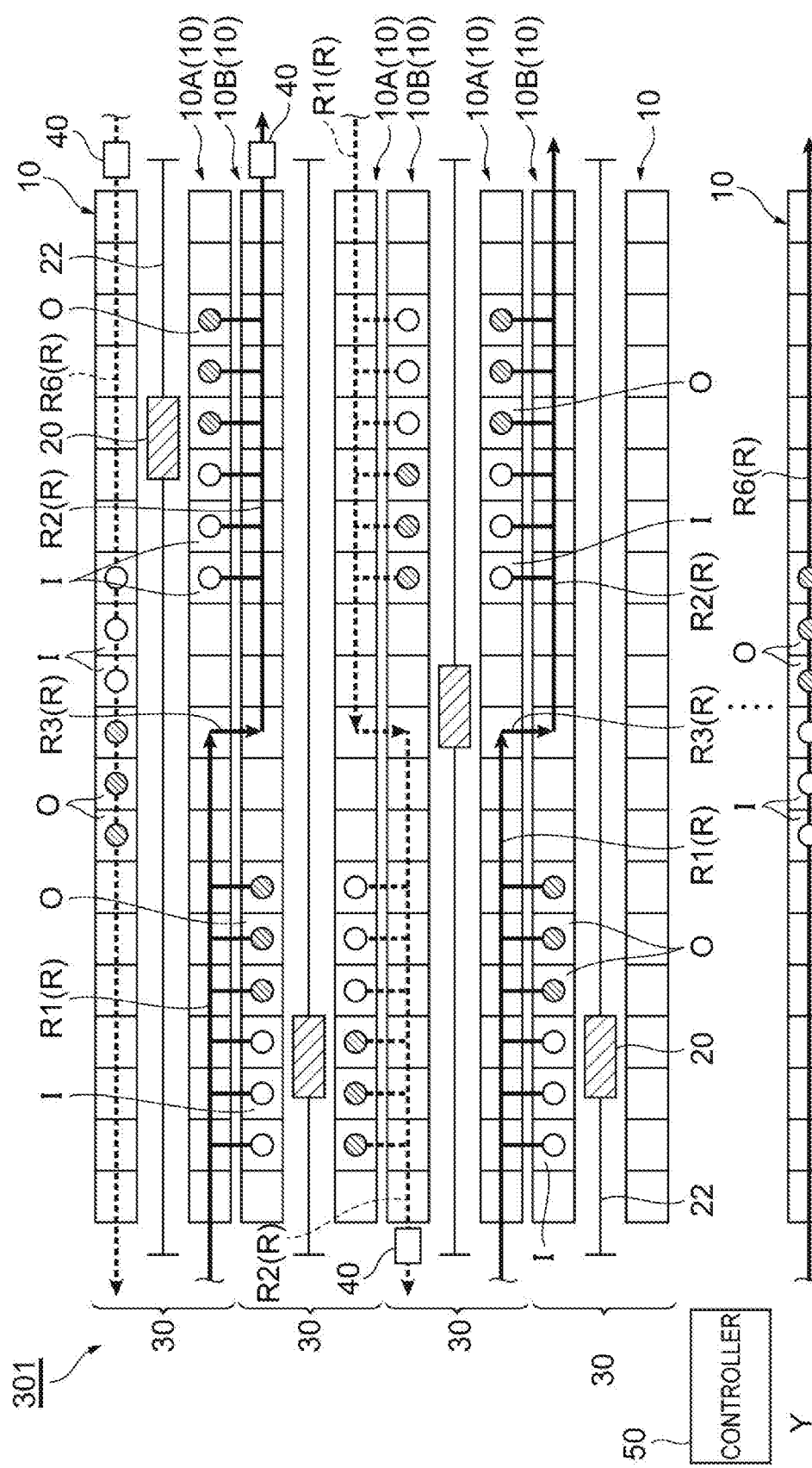
FIG. 6 is a schematic plan view illustrating an arrangement structure of an automated storeroom system according to a fourth example.

As illustrated in FIG. 6, in this automated storeroom system 301 according to the fourth example, in an adjacent pair of storerooms 30, one-way traffic directions in the first routes R1 and the second routes R2 are different between one storeroom 30 and the other storeroom 30. Specifically, in the one storeroom 30, the first route R1 is provided from one end of a lower portion of the first rack 10A to the center thereof in the X-direction, the second route R2 is provided from the other end of a lower portion of the second rack 10B to the center thereof, and the direction from the one end of the rack 10 toward the other end thereof is its one-way traffic direction. In the other storeroom 30, the first route R1 is provided from the other end in the lower portion of the first rack 10A to the center thereof in the X-direction, the second route R2 is provided from the one end in the lower portion of the second rack 10B to the center thereof, and the direction from the other end of the rack 10 toward the one end thereof is its one-way traffic direction.

In this example, the route R along which each transport vehicle 40 travels further includes third routes R6. The third routes R6 pass in the Y-direction through lower portions of racks 10 that are positioned at both ends of the automated storeroom system 301 in the Y-direction. On each third route R6, loading ports I and unloading ports O are provided. The loading ports I and the unloading ports O on the third route R6 are each provided with a placement platform on which an article L is to be placed. In the placement platform of each of the loading ports I and the unloading ports O on the third route R6, a space is formed through which a transport vehicle 40 conveying an article L placed on the lifter 42 thereof that has been raised can pass in the X-direction.

At least some of the loading ports I are arranged in a manner opposed to unloading ports O in the Y-direction with a traveling rail 22 interposed therebetween. At least some of the unloading ports O are arranged in a manner opposed to loading ports I in the Y-direction with the traveling rail 22 interposed therebetween.

In the automated storeroom system 301 according to this example, the route R does not include a route along which each transport vehicle 40 is circulated only (route that does not pass through a lower portion of a rack 10). In the route R, by using routes passing through lower portions of the racks 10 (the above-described routes R1 to R3 and R6), the transport vehicle 40 can be circulated, that is, a circulation route can be formed.

As described above, also in the automated storeroom system 301, many articles L can be loaded and unloaded in a small space. In the automated storeroom system 301, the crane-integrated operation can be performed. In the automated storeroom system 301, the one-way traffic directions of the first routes R1 and the second routes R2 can be made different among a plurality of the storerooms 30. Thus, each transport vehicle 40 can enter (load an article L) from both of one end side and the other end side of the racks 10 in the X-direction, and also the transport vehicle 40 can exit (unload an article L) from both of one end side and the other end side of the racks 10 in the X-direction.

Example

The following describes an automated storeroom system according to a fifth example. In the description of this example, points different from those in the fourth example will be described.

Figure 7:
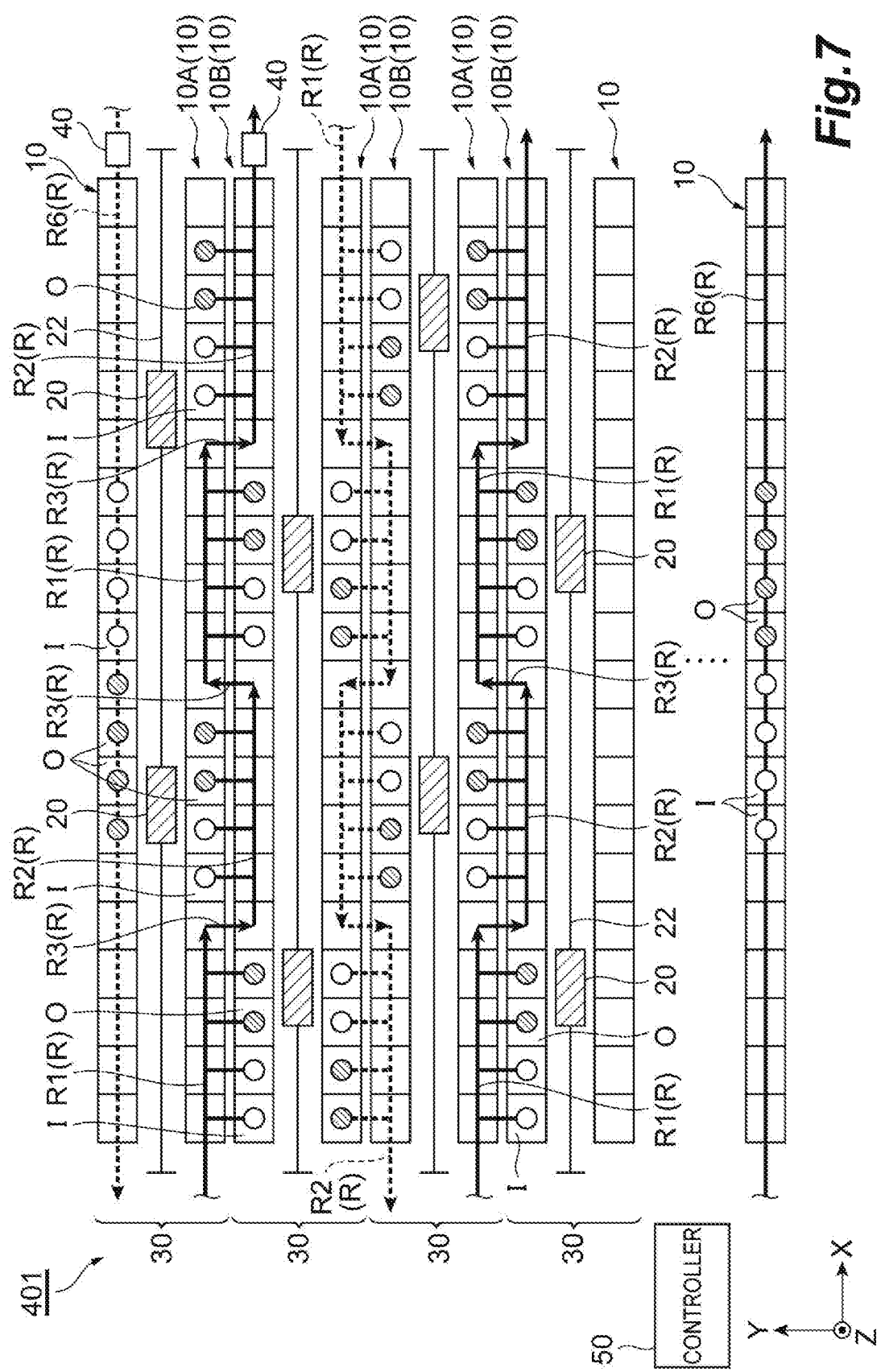
FIG. 7 is a schematic plan view illustrating an arrangement structure of an automated storeroom system according to a fifth example.

As illustrated in FIG. 7, in this automated storeroom system 401 according to the fifth example, each storeroom 30 has two stacker cranes 20 arranged in series. The route R along which each transport vehicle 40 travels includes two first routes R1, two second routes R2, and three connection routes R3. In a lower portion of each first rack 10A and a lower portion of the corresponding second rack 10B, each transport vehicle 40 travels on the first route R1, moves to the second route R2 through the connection route R3, travels on the second route R2, then moves to the first route R1 through the connection route R3, travels on the first route R1 again, moves to the second route R2 through the connection route R3, and travels on the second route R2. The transport vehicle 40 travels in a rectangular wave pattern between the lower portion of the first rack 10A and the lower portion of the second rack 10B.

As described above, also in the automated storeroom system 401, many articles L can be loaded and unloaded in a small space. In the automated storeroom system 401, loading and unloading can be performed into and from a storeroom 30 having two stacker cranes 20, and thus more articles L can be loaded and unloaded.

Examples have been described above. However, this disclosure is not limited to the examples.

In the examples, in a lower portion of each first rack 10A, a first transport-vehicle retreat space that a transport vehicle 40 can enter from a second route R2 and the transport vehicle 40 can exit into the second route R2 may be formed, separately from each loading port I and each unloading port O. In a lower portion of each second rack 10B, a second transport-vehicle retreat space that a transport vehicle 40 can enter from a first route R1 and the transport vehicle 40 can exit into the first route R1 may be formed, separately from the loading port I and the unloading port O. The first transport-vehicle retreat space and the second transport-vehicle retreat space are each a space in which a transport vehicle 40 can be accommodated and can be formed, for example, by removing structural members such as lattices and back-side braces in a lower portion of a rack 10. In other words, these spaces are each a space formed by removing the placement platform 61 from the loading port I or the unloading port O. With this configuration, into the first transport-vehicle retreat space in the lower portion of the first rack 10A or the second transport-vehicle retreat space in the lower portion of the second rack 10B, a transport vehicle 40 enters below, and thus another following transport vehicle 40 can overtake the transport vehicle 40 on the second route R2 or the first route R1. The first transport-vehicle retreat space may be connected orthogonally to the second route R2, and the second transport-vehicle retreat space may be connected orthogonally to the first route R1. This configuration is a configuration that can be achieved particularly when the transport vehicle 40 is what is called a floor-traveling vehicle that can move at a right angle.

In the examples, each storeroom 30 has a single-reach type configuration. However, the storeroom 30 may have a double-reach type configuration. In the examples, each first rack 10A and the corresponding second rack 10B are separated functionally. However, the structures thereof may be integrally configured. In the examples, a transport vehicle 40 is caused to enter below from the first route R1 or the second route R2 to transfer an article L. However, into a loading port I and from an unloading port O of a rack 10 positioned at one end in the Y-direction, an article L may be transferred by causing a transport vehicle 40 to enter below from a circulation route R4 provided closely to the rack 10.

In the examples, each transport vehicle 40 includes the lifter 42 as a transfer device. However, the type and specification of the transfer device included by the transport vehicle 40 is not limited to a particular one. The transport vehicle 40 may include a transfer device other than the lifter 42. The transport vehicle 40 may be a vehicle of a rear-hook type, a clamp type, a fork type, or a front-hook type, for example. In this example, for example, the transport vehicle 40 can transfer an article L to and from a second rack 10B by stopping on the corresponding first route R1 and expanding and contracting its arm to and from the second rack 10B. In this example also, for example, the transport vehicle 40 can transfer an article L to and from a first rack 10A by stopping on the corresponding second route R2 and expanding and contracting its arm to and from the first rack 10A.

In the examples, at least part of the route R passes through lower portions of racks 10. However, positions of the racks 10 through which the route R passes are not limited to particular ones, and may be upper portions of the racks 10, or may be middle portions of the racks 10 in the vertical direction. For example, when each transport vehicle 40 is an overhead traveling vehicle, a route R such as a rail may be arranged to pass through upper portions of the racks 10. In the examples, the transport vehicle 40 may be retreated by using a loading port I or an unloading port O.

The invention claimed is:

1. An automated storeroom system comprising:
   a plurality of storerooms each including a rack and a stacker crane; and
   a transport vehicle configured to travel along a preset route to load and unload an article into and from the storerooms, wherein
   a first rack that is the rack in one storeroom of an adjacent pair of the storerooms and a second rack that is the rack in the other storeroom thereof are disposed opposed to each other, and the preset route along which the transport vehicle travels includes:
      a first route passing through the first rack in a longitudinal direction of the first rack and configured to allow the transport vehicle to transfer the article onto the second rack;
      a second route passing through the second rack in a longitudinal direction of the second rack and configured to allow the transport vehicle to transfer the article onto the first rack; and
a connection route provided from either one of the first rack and the second rack to the other thereof and connecting the first route and the second route.

2. The automated storeroom system according to claim 1, wherein
the preset route along which the transport vehicle travels further comprises a circulation route connected to at least either one of the first route and the second route outside the rack, wherein
the first route and the second route each are a one-way traffic route on which the transport vehicle travels only in one direction.

3. The automated storeroom system according to claim 1, wherein
the transport vehicle comprises a lifter configured to raise and lower the article to be conveyed,
a placement platform on which the article is to be placed is provided in each of a lower portion of the first rack into which the article is to be transferred from the second route by the transport vehicle and a lower portion of the second rack into which the article is to be transferred from the first route by the transport vehicle, and
the placement platform has a space that allows the transport vehicle to enter below the placement platform.

4. The automated storeroom system according to claim 1, wherein
each storeroom comprises at least two stacker cranes arranged in series, and
the route along which the transport vehicle travels comprises at least two first routes, at least two second routes, and at least three connection routes.

5. The automated storeroom system according to claim 1, wherein
a first transport-vehicle retreat space that the transport vehicle is capable of entering from the second route and the transport vehicle is capable of exiting into the second is formed in a lower portion of the first rack, and
a second transport-vehicle retreat space that the transport vehicle is capable of entering from the first route and the transport vehicle is capable of exiting into the first route is formed in a lower portion of the second rack.

6. The automated storeroom system according to claim 2, wherein
the transport vehicle comprises a lifter configured to raise and lower the article to be conveyed,
a placement platform on which the article is to be placed is provided in each of a lower portion of the first rack into which the article is to be transferred from the second route by the transport vehicle and a lower portion of the second rack into which the article is to be transferred from the first route by the transport vehicle, and
the placement platform has a space that allows the transport vehicle to enter below the placement platform.

7. The automated storeroom system according to claim 2, wherein
each storeroom comprises at least two stacker cranes arranged in series, and
the preset route along which the transport vehicle travels comprises at least two first routes, at least two second routes, and at least three connection routes.

8. The automated storeroom system according to claim 3, wherein
each storeroom comprises at least two stacker cranes arranged in series, and
the preset route along which the transport vehicle travels comprises at least two first routes, at least two second routes, and at least three connection routes.

9. The automated storeroom system according to claim 2, wherein
a first transport-vehicle retreat space that the transport vehicle is capable of entering from the second route and the transport vehicle is capable of exiting into the second is formed in a lower portion of the first rack, and
a second transport-vehicle retreat space that the transport vehicle is capable of entering from the first route and the transport vehicle is capable of exiting into the first route is formed in a lower portion of the second rack.

10. The automated storeroom system according to claim 3, wherein
a first transport-vehicle retreat space that the transport vehicle is capable of entering from the second route and the transport vehicle is capable of exiting into the second is formed in a lower portion of the first rack, and
a second transport-vehicle retreat space that the transport vehicle is capable of entering from the first route and the transport vehicle is capable of exiting into the first route is formed in a lower portion of the second rack.

11. The automated storeroom system according to claim 4, wherein
a first transport-vehicle retreat space that the transport vehicle is capable of entering from the second route and the transport vehicle is capable of exiting into the second is formed in a lower portion of the first rack, and
a second transport-vehicle retreat space that the transport vehicle is capable of entering from the first route and the transport vehicle is capable of exiting into the first route is formed in a lower portion of the second rack.

* * * * *